United States Patent
Roy et al.

(10) Patent No.: US 12,298,757 B2
(45) Date of Patent: May 13, 2025

(54) METHOD AND APPARATUS FOR EVENT PREDICTION FOR A PHYSICAL SYSTEM BASED ON DATA SOLELY COLLECTED FROM THE PHYSICAL SYSTEM

(71) Applicants: Arizona Board of Regents on Behalf of Arizona State University, Scottsdale, AZ (US); Mayo Foundation for Medical Education and Research, Rochester, MN (US)

(72) Inventors: Asim Roy, Phoenix, AZ (US); Phillip Schulte, Rochester, MN (US); Lyle J. Olson, Rochester, MN (US); Charles J. Bruce, Ponte Vedra Beach, FL (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 695 days.

(21) Appl. No.: 17/286,303

(22) PCT Filed: Oct. 18, 2019

(86) PCT No.: PCT/US2019/057070
§ 371 (c)(1),
(2) Date: Apr. 16, 2021

(87) PCT Pub. No.: WO2020/082027
PCT Pub. Date: Apr. 23, 2020

(65) Prior Publication Data
US 2021/0382472 A1    Dec. 9, 2021

Related U.S. Application Data

(60) Provisional application No. 62/747,585, filed on Oct. 18, 2018.

(51) Int. Cl.
G05B 23/02 (2006.01)
G06F 11/30 (2006.01)
G06F 11/34 (2006.01)

(52) U.S. Cl.
CPC ...... G05B 23/0283 (2013.01); G06F 11/3013 (2013.01); G06F 11/3452 (2013.01)

(58) Field of Classification Search
CPC ............. G05B 23/0283; G05B 23/024; G06F 11/3013; G06F 11/3452
See application file for complete search history.

(56) References Cited

U.S. PATENT DOCUMENTS 10,441,832 B1 * 10/2019 Trivelpiece ............ G08B 17/06
2014/0074300 A1 * 3/2014 Shilts .................... G06Q 50/06
700/276

(Continued)

FOREIGN PATENT DOCUMENTS

WO    2020082027 A1    4/2020

OTHER PUBLICATIONS

Adams, D. E., "Nonlinear damage models for diagnosis and prognosis in structural dynamic systems," Component and Systems Diagnostics, Prognostics, and Health Management II, vol. 4733, 2022, pp. 180-191.

(Continued)

Primary Examiner — Christopher W Carter
(74) Attorney, Agent, or Firm — Elliott, Ostrander & Preston, P.C.

(57) ABSTRACT

A physical system receives and records measurements from a plurality of sensors for the physical system over a period of time and creates therefrom a statistical model of normal behavior of the physical system. The statistical model is applied to monitor the physical system for events or significant changes. The method detects events or significant (Continued)

changes in the operation or behavior of the physical system responsive to the monitoring of the physical system for events or significant changes. Events or significant changes in the operation or behavior of the physical system may cause a notification or alert, which can be sent a supervisory system.

16 Claims, 10 Drawing Sheets

(56) References Cited

U.S. PATENT DOCUMENTS

| | | | | |
|---|---|---|---|---|
| 2014/0108314 | A1* | 4/2014 | Chen | G06F 11/3072 706/20 |
| 2016/0019185 | A1 | 1/2016 | Zatylny et al. | |
| 2017/0032281 | A1* | 2/2017 | Hsu | G05B 19/41875 |
| 2017/0147773 | A1* | 5/2017 | Van De Stolpe | G16H 40/67 |
| 2018/0087790 | A1* | 3/2018 | Perez | F24F 11/52 |
| 2018/0300631 | A1* | 10/2018 | Roy | G06N 3/088 |
| 2019/0057070 | A1 | 2/2019 | Cogan | |

OTHER PUBLICATIONS

Atiya, A. F. et al., "A Comparison Between Neural-Network Forecasting Techniques-Case Study: River Flow Forecasting," IEEE Transactions on Neural Networks, vol. 10, No. 2, 1999, pp. 402-409.
Bruce, C.J. et al., "Technologies for Maintenance of Independent Living in Heart Failure Patients," Nih RO1 2015, Mayo Clinic Jacksonville, Jacksonville, FL, United States, https://reporter.nih.gov/project-details/8519203.
Casoetto, N., et al., "Multisensor Process Performance Assessment Through Use of Autoregressive Modeling and Feature Maps," Journal of Manufacturing Systems, vol. 22, No. 1, 2003, pp. 64-72.
Chandrashekar, G., et al., "A survey on feature selection methods," Computers & Electrical Engineering, 40(1), 2014, pp. 16-28.
Chaudhry, S. I., et al., "Telemonitoring in Patients with Heart Failure," New England Journal of Medicine, 363(24), 2010, pp. 2301-2309.
Chelidze, D. et al., "A Dynamical Systems Approach to Failure Prognosis," Nonlinear Dynamics, vol. 37, 2004, pp. 307-322.
Choi, E. et al., "Using recurrent neural network models for early detection of heart failure onset," Journal of the American Medical Informatics Association, vol. 24, No. 2, 2017, pp. 361-370.
Dai, W., et al., "Prediction of hospitalization due to heart diseases by supervised learning methods," International Journal of Medical Informatics, 84(3), 2015, pp. 189-197.
Dy, J. G., "Unsupervised Feature Selection," Computational Methods of Feature Selection, Chapter 2, 2008, pp. 19-39.
Friedman, J. H. et al., "Projection Pursuit Regression," Journal of the American Statistical Association, vol. 76, Issue 376, 1981, pp. 817-823.
Friedman, J. H., "Multivariate Adaptive Regression Splines," The Annals of Statistics, vol. 19, No. 1, 1991, pp. 1-67.
Gola, G. et al., "From measurement collection to remaining useful life estimation: defining a diagnostic-prognostic frame for optimal maintenance scheduling of choke valves undergoing erosion," Annual Conference of the Prognostics and Health Management Society, vol. 3, No. 1, 2011, 8 pages.
Heimes, F. O., "Recurrent Neural Networks for Remaining Useful Life Estimation," 2008 International Conference on Prognostics and Health Management, 2008, pp. 1-6.
Husmeier, D., "Neural Networks for Conditional Probability Estimation: Forecasting Beyond Point Predictions," 2012, Springer Science & Business Media.
International Search Report and Written Opinion for International Patent Application No. PCT/US2019/057070 dated Jan. 14, 2020, 12 pages.
Kansagara, D. et al., "Risk Prediction Models for Hospital Readmission: A Systematic Review," Journal of American Medical Association, vol. 306, No. 15, 2011, pp. 1688-1698.
Kohonen, T. et al., "Self-organizing map," 1990, pp. 113-122.
Lei, Y. et al., "A Model-Based Method for Remaining Useful Life Prediction of Machinery," IEEE Transactions on Reliability, vol. 65, No. 3, 2016, pp. 1314-1326.
Liang, Y. et al., "Improving Signal Prediction Performance of Neural Networks Through Multiresolution Learning Approach," IEEE Transactions on Systems, Man, and Cybernetics, Part B (Cybernetics), vol. 36, No. 2, 2006, pp. 341-352.
Liu, J. et al., "A data-model-fusion prognostic framework for dynamic system state forecasting," Engineering Applications of Artificial Intelligence, 25(4), 2012, pp. 814-823.
Lloyd, S., "Least squares quantization in PCM," IEEE Transactions on Information Theory, 28(2), 1982, pp. 129-137.
Luo, J. et al., "An Interacting Multiple Model Approach to Model-based Prognostics," SMC'03 Conference Proceedings, 2003 IEEE International Conference on Systems, Man and Cybernetics, Conference Theme-System Security and Assurance (Cat. No. 03CH37483), vol. 1, 2003, pp. 189-194.
Mortazavi, B. J. et al., "Analysis of Machine Learning Techniques for Heart Failure Readmissions," Circulation: Cardiovascular Quality and Outcomes, vol. 9, No. 6, 2016, pp. 629-640.
Nystad, B. H. et al., "Lifetime models for remaining useful life estimation with randomly distributed failure thresholds," European Conference of Prognostics and Health Management Society, vol. 1., No. 1., 2012, 7 pages.
Pantelopoulos, A. et al., "A Survey on Wearable Sensor-Based Systems for Health Monitoring and Prognosis," IEEE Transactions on Systems, Man, and Cybernetics, Part C (Applications and Reviews), vol. 40, No. 1, 2009, pp. 1-12.
Preventice. BodyGuardian Remote Monitoring System.™ https:web.archive.org/web/20200804050217//www.preventicesolutions.com/patients/body-guardian-heart.html (captured 20200729).
Qiu, H., et al., "Robust performance degradation assessment methods for enhanced rolling element bearing prognostics," Advanced Engineering Informatics, 17(3-4), 2003, pp. 127-140.
Rahimi, K. et al., "Risk Prediction in Patients with Heart Failure: A Systematic Review and Analysis," JACC: Heart Failure, vol. 2, No. 5, 2014, pp. 440-446.
Ross, J. S. et al., "Statistical Models and Patient Predictors of Readmission for Heart Failure: A systematic Review," Archives of Internal Medicine, vol. 168, No. 13, 2008, pp. 1371-1386.
Roy, A. et al., "Failure prediction using personalized models and an application to heart failure prediction," 2019, 15 pages.
Tian, Z., "An artificial neural network method for remaining useful life prediction of equipment subject to condition monitoring," Journal of Intelligent Manufacturing, 23(2), 2012, pp. 227-237.
Tong, H. et al., "Threshold Autoregression, Limit Cycles and Cyclical Data," Journal of the Royal Statistical Society, Series B (Methodological), vol. 42, No. 3, 1980, pp. 245-292.
Wang, Y. et al., "Early Detection of Heart Failure with Varying Prediction Windows by Structured and Unstructured Data in Electronic Health Records," 2015 37th Annual International Conference of the IEEE Engineering in Medicine and Biology Society (EMBC), 2015, pp. 2530-2533.

\* cited by examiner

| Type of Bio-signal | Type of Sensor | Description of measured data |
|---|---|---|
| Electrocardiogram (ECG) | Skin/Chest electrodes | Electrical activity of the heart (continuous waveform showing the contraction and relaxation phases of the cardiac cycles) |
| Blood pressure (systolic & diastolic) | Arm cuff-based monitor | Refers to the force exerted by circulating blood on the walls of blood vessels, especially the arteries |
| Body and/or skin temperature | Temperature probe or skin patch | A measure of the body's ability to generate and get rid of heat |
| Respiration rate | Piezoelectric/piezoresistive sensor | Number of movements indicative of inspiration and expiration per unit time (breathing rate) |
| Oxygen saturation | Pulse Oximeter | Indicates the oxygenation or the amount of oxygen that is being "carried" in a patient's blood |
| Heart rate | Pulse Oximeter/skin electrodes | Frequency of the cardiac cycle |
| Perspiration (sweating) or skin conductivity | Galvanic Skin Response | Electrical conductance of the skin is associated with the activity of the sweat glands |
| Heart sounds | Phonocardiograph | A record of heart sounds, produced by a properly placed on the chest microphone (stethoscope) |
| Blood glucose | Strip-base glucose meters | Measurement of the amount of glucose (main type/source of sugar/energy) in blood |
| Electromyogram (EMG) | Skin electrodes | Electrical activity of the skeletal muscles (characterizes the neuromuscular system) |
| Electroencephalogram (EEG) | Scalp placed electrodes | Measurement of electrical spontaneous brain activity and other brain potentials |
| Body Movements | Accelerometer | Measurement of acceleration forces in the 3D space |

Figure 2 – PRIOR ART

| Data Point | Time t | X(1) | X(2) | X(3) | X(4) |
|---|---|---|---|---|---|
| D1 | t = 1 | 1 | 2 | 3 | 4 |
| D2 | t = 2 | 5 | 6 | 7 | 8 |
| D3 | t = 3 | 0 | 2 | 4 | 6 |
| D4 | t = 4 | 3 | 5 | 7 | 9 |
| D5 | t = 5 | 2 | 4 | 6 | 8 |
| D6 | t = 6 | 1 | 3 | 5 | 7 |
| D7 | t = 7 | 5 | 3 | 1 | 0 |
| D8 | t = 8 | 2 | 4 | 6 | 8 |
| D9 | t = 9 | 5 | 4 | 3 | 2 |

Figure 3

| Node Number | Count of data points assigned to the node |
|---|---|
| Node 1 | 17 |
| Node 2 | 14 |
| Node 3 | 87 |
| Node 4 | 9 |
| Node 5 | 16 |
| Node 6 | 5 |
| Node 7 | 26 |
| Node 8 | 6 |
| Node 9 | 7 |
| Node 10 | 63 |
| Node 11 | 23 |
| Node 12 | 15 |

Figure 5

| Nodes combined | Count of data points in the consolidated clusters |
|---|---|
| 2, 3, 5, 6, 7 | 148 |
| 1, 4 | 26 |
| 8, 9, 10, 11, 12 | 114 |

Figure 6

| Cluster sizes in consolidated form | | | |
|---|---|---|---|
| 4x3 SOM | 3x3 SOM | 5x2 SOM | Average |
| 148 | 133 | 151 | 144 |
| 26 | 33 | 28 | 29 |
| 114 | 122 | 109 | 115 |

Figure 7

| | 4 highest ranking features | | | |
|---|---|---|---|---|
| Patient A | SVC | SinTACHY | Respiration Rate | NSR |
| Patient B | PVC | SVC | SinTACHY | NSR |
| Patient C | Afib normal | Unclassified rhythm | Respiration Rate | NSR+IVCD |

Figure 8

|  | Day 0 | Day 1 | Day 2 | Day 3 | Day 4 | Day 5 | Day 6 | Day 7 | Day 8 | Day 9 | Day 10 |
|---|---|---|---|---|---|---|---|---|---|---|---|
| Cluster 1 | 144 | 282 | 288 | 252 | 169 | 119 | 288 | 286 | 280 | 158 | 288 |
| Cluster 2 | 29 | 0 | 0 | 0 | 0 | 0 | 0 | 0 | 0 | 0 | 0 |
| Cluster 3 | 115 | 2 | 0 | 0 | 0 | 1 | 0 | 0 | 1 | 1 | 0 |
| TOTAL DATA POINTS | 288 | 284 | 288 | 252 | 169 | 120 | 288 | 286 | 281 | 159 | 288 |

Figure 9

|  | Day 0 | Day 1 | Day 2 | Day 3 | Day 4 | Day 5 | Day 6 | Day 7 | Day 8 | Day 9 | Day 10 |
|---|---|---|---|---|---|---|---|---|---|---|---|
| SVC | 1323 | 153 | 21 | 25 | 20 | 21 | 50 | 25 | 18 | 9 | 21 |
| SinTACHY | 495 | 86 | 8 | 21 | 13 | 22 | 48 | 18 | 18 | 15 | 10 |
| Respiration Rate | 16.20 | 13.00 | 13.00 | 13.00 | 13.00 | 12.58 | 8.53 | 13.38 | 16.27 | 13.51 | 14.79 |
| NSR | 375 | 67 | 3 | 13 | 7 | 8 | 13 | 4 | 1 | 2 |  |

Figure 10

|  | Day 0 | Day 1 | Day 2 | Day 3 | Day 4 | Day 7 | Day 8 | Day 9 | Day 10 | Day 11 | Day 12 | Day 13 | Day 14 | Day 15 |
|---|---|---|---|---|---|---|---|---|---|---|---|---|---|---|
| Cluster 1 | 75 | 48 | 64 | 78 | 52 | 220 | 61 | 15 | 158 | 189 | 201 | 242 | 241 | 173 |
| Cluster 2 | 31 | 110 | 69 | 67 | 60 | 57 | 69 | 36 | 125 | 97 | 83 | 41 | 42 | 115 |
| Cluster 3 | 140 | 75 | 130 | 109 | 150 | 0 | 157 | 237 | 3 | 0 | 0 | 0 | 0 | 0 |
| TOTAL DATA POINTS | 246 | 233 | 263 | 254 | 262 | 277 | 287 | 288 | 286 | 286 | 284 | 283 | 283 | 288 |

Figure 11

|  | Day 0 | Day 1 | Day 2 | Day 3 | Day 4 | Day 7 | Day 8 | Day 9 | Day 10 | Day 11 | Day 12 | Day 13 | Day 14 | Day 15 |
|---|---|---|---|---|---|---|---|---|---|---|---|---|---|---|
| PVC | 514 | 456 | 285 | 383 | 713 | 485 | 838 | 1344 | 845 | 886 | 762 | 545 | 441 | 896 |
| SVC | 25 | 9 | 17 | 20 | 51 | 7 | 33 | 35 | 35 | 30 | 37 | 34 | 31 | 38 |
| SinTACHY | 0 | 1 | 1 | 1 | 1 | 1 | 5 | 9 | 4 | 3 | 1 | 0 | 1 | 5 |
| NSR | 173 | 189 | 173 | 221 | 142 | 318 | 315 | 288 | 444 | 311 | 121 | 116 | 204 | 331 |

Figure 12

|  | Day 0 | Day 2 | Day 3 | Day 4 | Day 12 | Day 15 | Day 17 | Day 18 |
|---|---|---|---|---|---|---|---|---|
| Cluster 1 | 89 | 82 | 100 | 79 | 142 | 118 | 103 | 123 |
| Cluster 2 | 128 | 124 | 103 | 165 | 88 | 108 | 84 | 95 |
| Cluster 3 | 44 | 76 | 83 | 44 | 39 | 21 | 101 | 70 |
| TOTAL DATA POINTS | 261 | 282 | 286 | 288 | 269 | 247 | 288 | 288 |

Figure 13

|  | Day 0 | Day 2 | Day 3 | Day 4 | Day 12 | Day 15 | Day 17 | Day 18 |
|---|---|---|---|---|---|---|---|---|
| Afib normal | 132 | 116 | 147 | 133 | 121 | 104 | 84 | 74 |
| Unclassified rhythm | 489 | 292 | 754 | 251 | 170 | 322 | 156 | 136 |
| Respiration Rate | 18.03 | 19.9 | 19.94 | 20.26 | 18.27 | 16.03 | 20.26 | 15.32 |
| NSR+IV CD | 45 | 55 | 45 | 4 | 6 | 29 | 42 | 45 |

Figure 14

METHOD AND APPARATUS FOR EVENT PREDICTION FOR A PHYSICAL SYSTEM BASED ON DATA SOLELY COLLECTED FROM THE PHYSICAL SYSTEM

CLAIM OF PRIORITY

This Application is a U.S. National Phase application under 35 U.S.C. § 371 of International Application No. PCT/US2019/057070, filed Oct. 18, 2019, entitled "METHOD AND APPARATUS FOR EVENT PREDICTION FOR A PHYSICAL SYSTEM BASED ON DATA SOLELY COLLECTED FROM THE PHYSICAL SYSTEM" and this application further claims the benefit of U.S. Provisional Application No. 62/747,585, filed October 18. 2018, the entire contents of which are hereby incorporated by reference herein as though set forth in full.

TECHNICAL FIELD

Embodiments of the invention relate to monitoring a physical system and predicting an event relating to the physical system, such as a failure of the physical system or a component thereof, based solely on data collected through the monitoring of the physical system.

BACKGROUND

Prior art approaches for event or failure prediction of a physical system (e.g., the heart in a human body, the engine of an airplane) from streaming data emanating from a number of sensors attached to the physical system measure different characteristics, e.g., operational or behavioral characteristics of that physical system. The prior art then predicts an event, such as failure, of the physical system by collecting event (e.g., failure) data of similar physical systems and then find common characteristics (patterns) that predict an event (e.g., failure) or the remaining life of the physical system. Such an approach entails collecting lots of data on similar physical systems before one can build an event prediction system.

In general, the first step in the process of creating predictive models for any phenomenon is data collection. For example, to predict fraud, an organization would collect lots of data on fraud and non-fraud cases. And to predict breast cancer from biopsies, one would collect lots of cases where the tumors were found to be either benign or malignant. The idea is to build models from a diverse set of cases so that the models can "generalize" and accurately account for the variety of cases that exist. But the attempt to generalize from very diverse cases can sometimes be problematic and can result in models that may not be very accurate in their predictions. Such diversity of cases arises often in the medical field because human bodies become very dissimilar physical systems over time. Thus, one would find patients with similar medical histories exhibiting different medical conditions making it difficult to identify common medical profiles for certain medical conditions. (Creating such common profiles is the task of generalization in machine learning.) For example, heart failure cases often have very different medical histories and, thus, makes it difficult to build highly accurate profiles for heart failure patients. Hence, generalization and accuracy of prediction suffer in such cases.

It is often possible to redefine the prediction problem and get more accurate predictions by simply focusing on the data produced by an individual physical system. In this scenario, one simply builds models of an individual physical system that, in effect, defines its normal operating characteristics. Such models do not compare an individual system's behavior with other similar systems. And these models can easily predict the behavior of the individual system under different circumstances. For example, in one particular NIH study of decompensated heart failure (DHF) that is explained herein below, DHF patients, after their first heart failure treatment, were released from the hospital with a package of devices for remote patient monitoring (RPM). The package included two ECG patches, an accelerometer and a bio-impedance measurement device. The purpose of the NIH study was to collect data on individual patients from the RPM devices and build models to predict the "onset" of next decompensated heart failure for such patients. But, given the diversity of the patient population in the study, any population-based predictive model using RPM and other medical data would not be very accurate. What is needed is a personalized model for each individual patient, based simply on the RPM data, which would be much more accurate in its prediction of the "onset" of DHF.

SUMMARY

Embodiments of the invention relate to a method of observing a physical system, based on regular measurements from a set of sensors attached to it, to predict an event, or the onset of the event, such as its failure. Such a physical system can be an inanimate object, e.g., the engine of an aircraft, or an animate object, the heart of a human body. The sensors can be electrocardiogram (ECG) and blood pressure measurement devices on a human body or temperature and airflow measurement devices on an aircraft engine, as examples. Based on measurements streamed from such sensors, the embodiments create a statistical model of "normal" behavior of the physical system. The embodiments create the statistical model by observing the physical system for a certain period of time. After creating the statistical model, the embodiments then use that model to monitor the physical system for changes. The embodiments monitor the physical system by continually collecting streaming data from the sensors and evaluating the behavior of the physical system using the statistical model. Embodiments can detect events or significant changes in the operation or behavior of the physical system (e.g. the "onset" of heart failure) and provide such information to an appropriate supervisory system (e.g. a physician or nurse in the case of a heart failure patient; an engineer, or alert mechanism, in the case of machine failure).

BRIEF DESCRIPTION OF THE DRAWINGS

Embodiments are illustrated by way of example, and not by way of limitation, and will be more fully understood with reference to the following detailed description when considered in connection with the figures in which:

FIG. 2 provides a table of different types of biosensors and the biosignals generated by them;

FIG. 3 provides a table of data points when slicing across a time-series to create each data point for clustering in accordance with an embodiment of the invention;

FIG. 5 provides a table with a count of data points at each node (cluster) of a 4×3 (12 node) Kohonen SOM after training, in accordance with an embodiment of the invention;

FIG. 6 provides a table with a count of data points in the consolidated clusters of the 4×3 (12 node) Kohonen SOM, in accordance with an embodiment of the invention;

FIG. 7 provides a table with cluster sizes in consolidated form in three different Kohonen SOMs, in accordance with one embodiment of the invention;

FIG. 8 provides a table with four highest ranking features for individual patients, in accordance with one embodiment of the invention;

FIG. 9 provides a table with data distribution for Patient A on subsequent days of monitoring, in accordance with one embodiment of the invention;

FIG. 10 provides a table with average feature values (or counts of feature values) for Patient A on subsequent days of monitoring, in accordance with one embodiment of the invention;

FIG. 11 provides a table with data distribution for Patient B on subsequent days of monitoring, in accordance with one embodiment of the invention;

FIG. 12 provides a table with average feature values (or counts of feature values) for Patient B on subsequent days of monitoring, in accordance with one embodiment of the invention;

FIG. 13 provides a table with data distribution for Patient C on subsequent days of monitoring, in accordance with one embodiment of the invention;

FIG. 14 provides a table with average feature values (or counts of feature values) for Patient C on subsequent days of monitoring, in accordance with one embodiment of the invention.

WRITTEN DESCRIPTION

Figure 1:
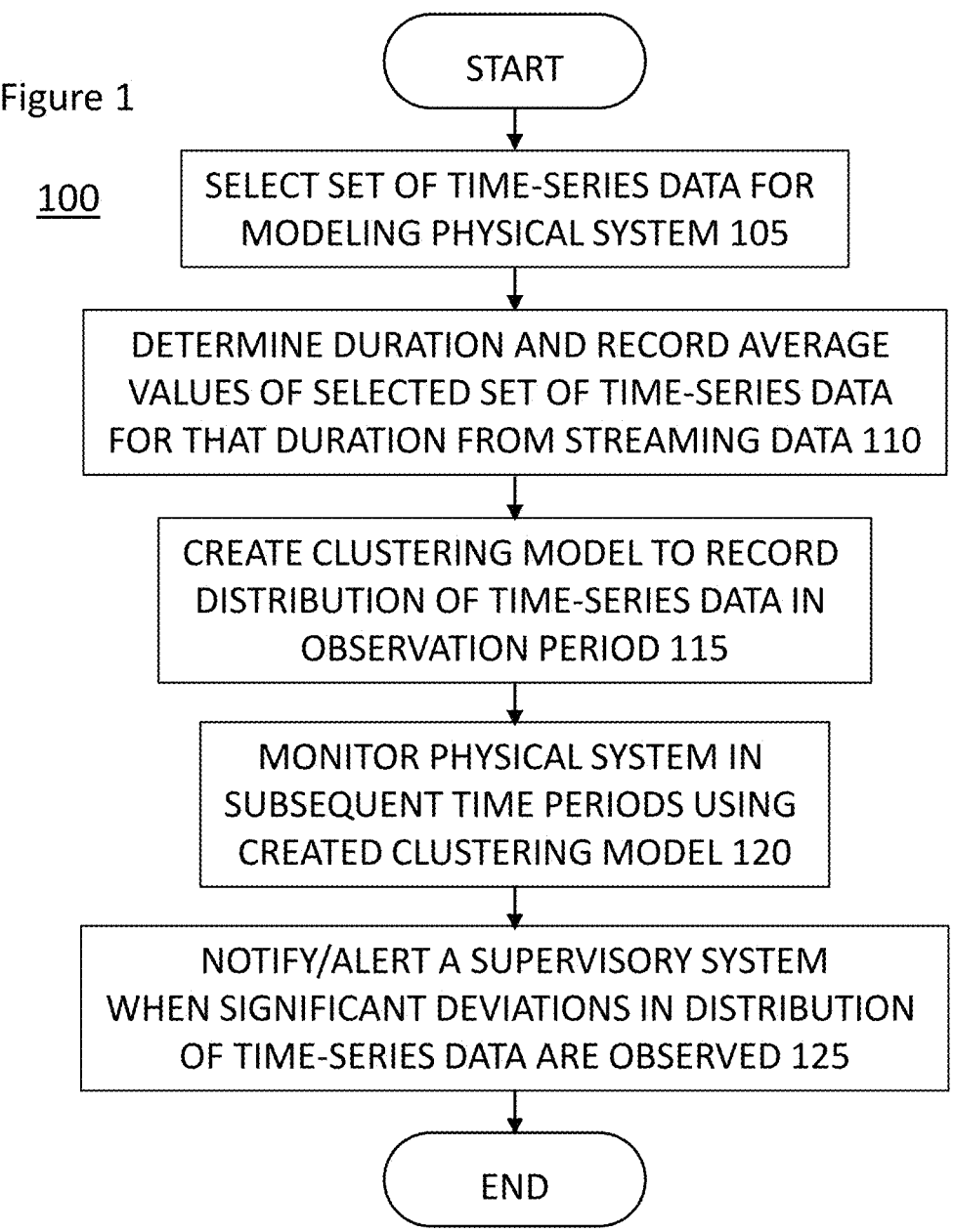
FIG. 1 is a flow diagram in accordance with an embodiment of the invention.

Embodiments of the invention provide for event (e.g., failure) prediction of a physical system (e.g., the heart in a human body, the engine of an airplane) from streaming data emanating from a number of sensors attached to that physical system that measure different characteristics, such as operational or behavioral characteristics, of that physical system. Embodiments of the invention rely solely on data collected from the particular physical system for which an event (e.g., failure) is to be predicted. In other words, embodiments of the invention build a customized or personalized model of the particular physical system to predict an event related to it, such as a failure of the particular physical system. Embodiments of the invention do not rely on, and do not need to obtain, information regarding how other similar physical systems operate leading up to such an event.

Embodiments of the invention provide a method for personalized or individualized modeling for failure prediction based on time-series data produced by sensors and other measurement instruments. The embodiments were used to predict the "onset" of subsequent decompensated heart failure of patients in a study, discussed in detail below. Heart failures are generally a slow degradation process and are similar to slow failure processes of many other physical systems. Thus, the embodiments can be applied to failure prediction of machinery and production processes with similar characteristics. Although the embodiments use time-series data produced by sensors and other instruments, the embodiments do not actually construct or use any time-series models. Rather, the embodiments examine the distribution of time-series data across specified time cycles to make predictions about the "onset" of failure. Failure prediction of slow degradation processes is also not strictly anomaly detection, but is more about trend analysis. The advantage of personalized modeling is that it does not require large amounts of data collection about other similar systems. And for situations where it is difficult to generalize from diverse population characteristics, personalized models can be far more accurate.

Embodiments of the invention are about personalizing a model for a physical system to predict the "onset" of a degradation process in the physical system. Such a model is solely based on data recorded at certain time intervals by a monitoring system for the physical system. It does not use or depend on any prior knowledge about such physical systems. For plants and machinery, such a monitoring system typically would consist of different types of sensors attached to them, such as the ones to measure vibration, pressure and temperature. For the particular heart failure case study discussed herein, a remote patient monitoring (RPM) system consists of two ECG recording patches, an accelerometer to monitor a patient's activity and a bio-impedance measuring device.

The sensors of a monitoring system can generate data at different frequencies. For example, ECG patches generate data every few milliseconds while blood pressure and weight might be recorded only a few times a day. The data generated by a sensor is essentially time-series data. When multiple sensors generate data at different frequencies, the frequencies need to be aligned for modeling purposes. There are different ways to align slow and high frequency time-series data. For example, temperature or pressure, if they are measured too frequently, can be averaged over a time interval to produce a lower frequency time-series. In the same way, if weight is measured infrequently, the same weight value can be used at subsequent time points until a new weight is recorded.

Sensors are usually attached to, in proximity of, or communicate wirelessly with, physical systems to measure various physical, behavioral, or operational, characteristics of the physical systems. These measurements are then collected by certain external devices (e.g., a controller, a computer, an electronic device, a smart phone) communicatively coupled with the sensors. These external devices, in turn, can analyze the measurements and extract or generate additional information from the analysis. In general, multiple sensors and downstream (external) devices produce streaming data that can be considered as time-series data. Thus, a physical system can be defined by the characteristics of multiple time-series data. In the prior art, one way to predict an event, such as the "onset" of degradation (the "onset" of a failure), is to model each time-series data from data generated during normal operations of the particular physical system, then monitor the system using these models and detect deviations from the normal operations. In contrast, embodiments of the invention, instead of building separate time-series models for different sensors (and for any derivative time-series generated by downstream devices), build a unified model from multiple time-series data and detect deviations from the normal operations or behavior using the unified model. In particular, we look for changes in the distribution of time-series data over time and then isolate one or more time-series that potentially is causing the degradation.

The general process for building customized or personalized models from time-series data from a physical system, according to an embodiment of the invention 100, are as follows, with reference to FIG. 1.

At step 105, logic selects a set of time-series data to use for modeling a particular physical system. The set may include one or both of original sensor/device measurements (e.g. the weight, respiration rate, and blood pressure of a patient) and derived measurements (e.g., QRS complex and atrial premature complexes from an electrocardiography (ECG)).

At step 110, logic determines a duration, P, and records the average values of the selected set of time-series data for that duration from streaming data produced by original sensor(s)/device(s), or external devices(s). For example, the duration P can be a millisecond, a minute, 5 minutes, hours, or days, depending on how frequently one should observe the physical system for failure or certain other events.

Suppose N is the total number in the set of time-series data whose average values within the duration P are being observed. Suppose T is the total number of such observed durations P, and $X(t, i)$, $i=1 \ldots N$, $t=1 \ldots T$, the average value of the $i^{th}$ time-series at the $t^{th}$ duration P, $t=1 \ldots T$. Here, $X(t, i)$, $i=1 \ldots N$ represents an observation of the particular physical system across all N in the set of time-series data at a point in time $t*P$.

At step 115, logic uses T number of collected observations of N time-series data, and creates a clustering model to record the distribution of time-series data in the observation period $T*P$. For example, one can monitor a heart failure patient every 5 minutes (P=5 minutes) for a day (T=12*24=288 durations of 5 minutes) to create a model of the patient. A clustering model such as a Kohonen Self-Organizing Map (SOM) can be used for this purpose. According to one embodiment, the resulting clustering model represents the normal behavior of the particular physical system and shows the distribution of time-series data values normally observed within a period of time $T*P$.

At step 120, logic monitors the particular physical system in subsequent time periods of length $T*P$ using the model created in step 115 and the data from the N time-series in subsequent time periods. For example, one can create a model for a heart failure patient from remote monitoring device data the day after discharge from a hospital and that model can define "normal functioning" of the patient after the hospital treatment. That model can then be used to monitor the patient on subsequent days for any significant changes as observed through the N time-series data for that day, such as those outside the statistical model of normal behavior or normal functioning of the patient.

At step 125, logic notifies/alerts a supervisory system if significant deviations, e.g., outside the range or normal behavior, or outside a certain range in the distribution of time-series data are observed.

This process (or modeling approach) is for an individual physical system and can be applied to any physical system, in general, to predict failure or some other event that deviates from the normal in terms of the operation or behavior of that physical system.

Embodiments of the invention may be implemented using standard software systems such as SPSS Modeler, a data mining and text analytics software application available from IBM, and R, an open source programming language for statistical computing and analysis supported by the R Foundation for Statistical Computing available under the GNU GPL v2 open source license agreement.

Advantages of Embodiments of the Invention

Customization or personalization of the model: medicine is generally based on finding common patterns in a population or sub-population. Thus, in the domain of heart failure prediction, lots of data on lots of heart failure cases would usually be collected and statistically analyzed to find patterns and signatures for heart failure in the population. By comparison, embodiments of the invention analyze the data from a single patient to predict the patient's next heart failure. Such an approach builds personalized models of patients from data and such an individualized modeling approach would work even if a patient is completely different from the normal population, for example, when the patient is an outlier in terms of physiological characteristics.

Data efficiency: building personalized models according to embodiments of the invention is very data efficient in the sense that it does not depend on collecting data from a large number of patients and then finding common patterns in the data for heart failure prediction.

Better prediction accuracy: A personalized model is thought to be more accurate in terms of prediction because the model is not attempting to account for patients with highly different physiological characteristics but instead is highly focused on a single patient characteristic.

Electronic Medical Records (EMR) data not required: embodiments of the invention do not depend on any EMR data. The embodiments build personalized models of patients solely based on physiological characteristics evident in the sensor data produced by the monitoring devices.

Personalized models created in real-time from streaming data: embodiments can build personalized models in real-time from streaming data generated by the various monitoring sensors.

General approach to personalized modeling any physical system: the embodiments for customized or personalized modeling described herein are general and not limited to prediction of the "onset" of decompensated heart failure. Embodiments can be used in a similar way to predict many other types of events from sensor data, whether medical events or other events. Embodiments can be used to build customized models of other physical systems (e.g. a sub-system in a power plant, an aircraft engine, a rocket) and then monitor such systems for failure or for other events based on the individualized models.

Applications for Embodiments of the Invention

Deliverable forms of products and services, embodied in software and hardware, according to embodiments of the invention, provide an event or failure prediction system that uses personalized models of physical systems from sensor data, both in software and hardware forms. In an Industrial Internet of Things (IIoT), there is growing resistance to uploading large amounts of sensor data to the cloud for analysis, mainly because it is costly. So it is preferable to do most of the analysis close to the source of the data; that is, at the edge of the IIoT. The failure prediction system, however, can be deployed both in the cloud and at the edge of the IIoT. The system uses machine learning on streaming sensor data to construct personalized models. One embodiment employs a specialized GPU-based system for machine learning and such machine learning hardware can be used to deploy the failure prediction system at the edge of the IIoT.

For heart failure monitoring, this failure prediction system can be embedded, either in software or hardware form, in the external device that collects the data obtained from sensors for a patient. A number of medical device manufacturers have products in this market in which embodiments of the invention may be embedded.

Heart failure prediction is but one of the applications of embodiments of the invention. An embodiment could be implemented within an external device that collects and monitors cardiac signals generated by an implanted or an external device (e.g., a cardiac rhythm management device).

Another application for an embodiment of the invention is predictive maintenance. An embodiment may be implemented within an external device that collects and monitors signals generated by sensors attached to a physical system. According to Wikipedia's characterization of predictive maintenance, (://en.wikipedia.org/wiki/Predictive_maintenance):

> Predictive maintenance (PdM) techniques are designed to help determine the condition of in-service equipment in order to predict when maintenance should be performed. This approach promises cost savings over routine or time-based preventive maintenance, because tasks are performed only when warranted. The main promise of predictive maintenance is to allow convenient scheduling of corrective maintenance, and to prevent unexpected equipment failures. The key is "the right information in the right time" . . . . Predictive maintenance differs from preventive maintenance because it relies on the actual condition of equipment, rather than average or expected life statistics, to predict when maintenance will be required. Some of the main components that are necessary for implementing predictive maintenance are data collection and preprocessing, early fault detection, fault detection, time to failure prediction, maintenance scheduling and resource optimization. Predictive maintenance has also been considered to be one of the driving forces for improving productivity and one of the ways to achieve "just-in-time" in manufacturing. (footnotes omitted)

Experimentation with Embodiments of the Invention

Experiments were conducted using embodiments of the invention. An NIH supported decompensated heart failure study conducted at Mayo Clinic provided the data for the experiments. The NIH study, Technologies for Maintenance of Independent Living in Heart Failure Patients, NIH RO1 2015, used the BodyGuardian Remote Monitoring System™ available from Preventice. The BodyGuardian system is an FDA 510 approved device used for remote monitoring of cardiac patients. It has a front-end that includes an adhesive snap-strip body sensor (BodyGuardian) with built-in electrodes that measure ECG signals and bio-impedance. It also has a 3-way accelerometer. Overall, the system measures heart rate, ECG, respiration rate (RR) and activity. It also communicates with off-body sensors such as a blood pressure (BP) cuff and scale to incorporate BP and weight data. In addition, it solicits symptoms from the user thus acting as an event recorder and recording simultaneous physiologic data. It wirelessly transmits all data to a central data analysis hub.

From ECG signals, bio-impedance measurements and accelerometer data, BodyGuardian derives 56 features. It classifies activity level in the range 0 to 100, which is then binned into 10 ranges. From the activity data, it derives three basic body positions: lying, leaning and standing. The experiments excluded activity level and body position data from the model. A number of features were extracted from ECG data, including: PVC (premature ventricular complex), SVC (supraventricular complex), NSR (normal sinus rhythm), Unclassified Rhythm, SinTachy (sinus tachycardia), SinBrady (sinus bradycardia), IVCD (interventricular conduction delay), Mobitz 1 and 2, AV Block (atrioventricular block), PJC (premature junctional complex), PAC (premature atrial contractions), SVTA (supraventricular tachyarrythmia), AFib (atrial fibrillation—slow, normal, rapid), IVR (idioventricular rhythm), VT (ventricular tachycardia), VF (ventricular fibrillation), minimum heart rate, and maximum heart rate. The data also includes blood pressure, respiration rate and weight.

Data was averaged every 5 minutes for modeling purposes, although the data is available on a finer time scale. In effect, the patient was observed every 5 minutes. When recorded continuously during a day, one should get 288 observations. A model was created using data for a single day and, then, that model was used to track changes in the patient's physiological profile on subsequent days. Since the physiological measurements varied during the course of a day, one approach was to model the distribution of the physiological data during the day.

Since, in this study, Mayo Clinic provides a patient with the BodyGuardian device only after a heart failure treatment, in general, the model is created for a patient after a full day of recording following discharge from the hospital. One can construct models using data over several days following discharge from the hospital, but there is a risk in the sense that there could be onset of decompensation very soon after discharge. The model is meant to reflect the physiological state of the patient before the onset of a subsequent decompensation.

The experiments did not use any clinical data of patients in the models. Nor did the experiments use data of other patients to build each individualized patient model. This concept of creating a personalized model based predominantly on data generated by wearable biosensors is novel and has wide applicability in many situations. FIG. 2 provides a table that shows some typical biosensors in use today and the biosignals generated by them. There are many factors driving the growth in usage of such wearable devices including: an aging population worldwide, the need to reduce hospital and emergency visits, and the need to monitor and manage chronic diseases remotely.

Experiments with embodiments of the invention included the following seven steps:

Step 1: Select a set of time-series to use for modeling the physical system. This set may include both original sensor/device measurements (e.g., weight, blood pressure of a patient) and derived measurements (e.g., QRS complex, atrial premature complexes from an ECG).

Step 2: Determine a time interval P for recording time-series data and record the average values of the selected time-series within that time interval from streaming data. For example, the time interval P can be a millisecond, a minute, or 5 minutes, and depends on how frequently one should observe the physical system for degradation or "onset" of failure or certain other events.

Step 3: Suppose recording the average values of N time-series in each time interval of duration P. Suppose T is the total number of observed time intervals during normal operations of the physical system, and X (t, i), i=1 . . . N, t=1 . . . T, the average value of the $i^{th}$ time-series at the $t^{th}$ time interval. Thus, X (t, i), i=1 . . . N, is an observation of the physical system across all N time-series at time t. Each time-series i, i=1 . . . N, represents a feature in the dataset.

Step 4: Using T collected observations of N time-series, create a clustering model to record the distribution of time-series data in that observation period T*P.

For example, one can monitor a heart failure patient every 5 minutes (P=5 minutes) for a day (T=12*24=288 durations of 5 minutes) to create a model of the patient. One can use a clustering model, such as Kohonen Self-Organizing Map (SOM), to model the distribution of the time-series data. The resulting clustering model represents normal behavior of the physical system and shows the distribution of time-series values normally observed within a period of time T*P.

Step 5: Obtain a ranking of the features (time-series) using any unsupervised feature ranking method or from the clustering method.

Step 6: Monitor the physical system in subsequent periods of length T*P using the model created in Step 4 and data from the N time-series. The monitoring tracks any changes in the distribution of time-series data. Monitoring essentially means passing the data through the clustering model and assigning each to the closest cluster. To understand the factors that cause a change from the normal behavior of the physical system, track some of the highest-ranked features (time-series) found in Step 5.

For example, one can create a model of a heart failure patient, using remote monitoring data, the day after discharge from a hospital and that model would then define "normal functioning" of the patient after the hospital treatment. One would then use that model to monitor the patient on subsequent days using the N time-series data for each day.

Step 7: If significant deviation in the distribution of the time-series data and in the trajectory of some of the highest ranked features occurs during the monitoring period, notify/alert a supervisory system of the change from normal.

Application of embodiments of the invention to predict the "onset" of decompensated heart failure is further discussed herein below. Steps 1 and 2 of the method according to embodiments of the invention, as applied to the heart failure case study, involve: (1) selection of time-series for modeling the patients, and (2) determination of the time interval P for time-series measurements. Step 3 sets up the data for clustering in Step 4. Following is an example of proper structuring of the data for clustering. FIG. 3 provides a table that shows four time series—X(1), X(2), X(3) and X(4)—and 9 values for each recorded over 9 time intervals. The first data point for clustering is D1=[1, 2, 3, 4] and the last data point is D9=[5, 4, 3, 2]. In essence, for the clustering model, each time-series corresponds to a feature and the time-series data is sliced across time.

Figure 4:
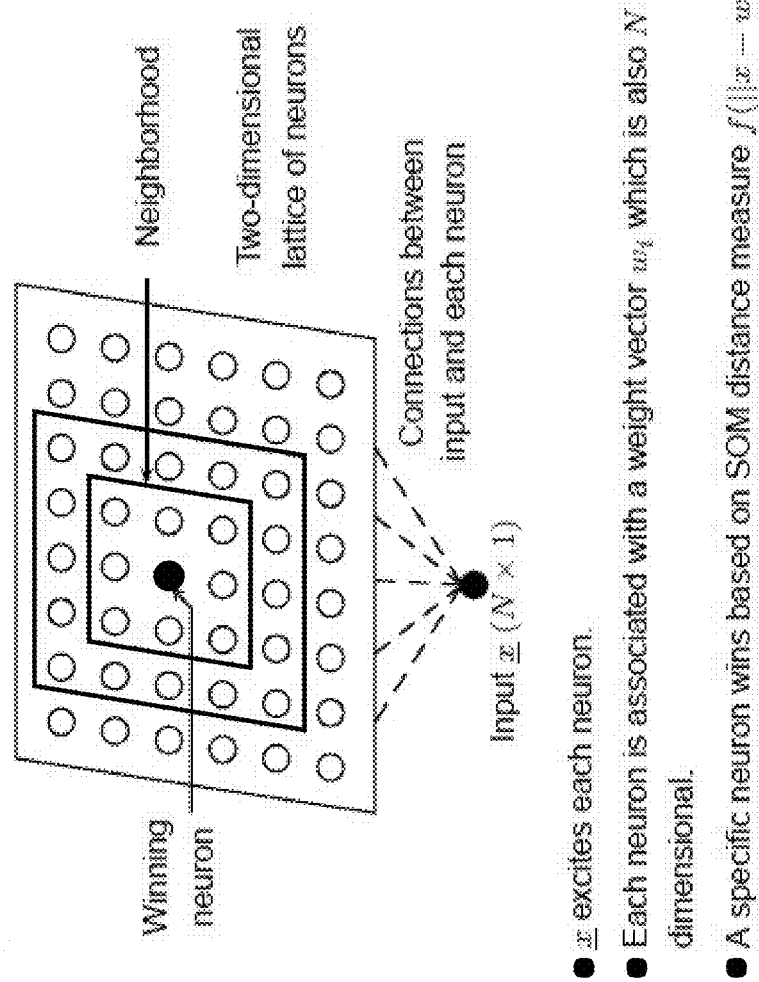
FIG. 4 illustrates a two-dimensional Kohonen map, in accordance with an embodiment of the invention.

In Step 4, the method creates clusters to characterize the distribution of the data during normal operations of the physical system. In one embodiment, Kohonen's Self Organizing Map (SOM) were used for clustering. However, one can use other methods as well such as K-means. A two-dimensional rectangular grid defines a Kohonen SOM as shown in FIG. 4. For example, a grid size of 4×3 has 12 nodes. As part of this step, since randomness is inherent in any clustering method, Kohonen SOMs of different sizes (e.g. 3×3, 4×3, 5×2) are trained to verify the data distribution. In addition, after training the Kohonen SOMs, nearby nodes (nearby clusters) of each SOM are combined to verify the consistency of the data distribution across the SOMs. For example, suppose a Kohonen SOM of size 4×3 is trained with data from one day of remote monitoring of a heart failure patient (which produces 288 data points) and suppose the resulting 12 node SOM produces the clusters shown in the table in FIG. 5. An embodiment then combines the closest nodes (clusters) to produce more consolidated clusters. The table in FIG. 6 shows the result of such a consolidation that produced three clusters from the 4×3 SOM clusters in the table in FIG. 5. The table in FIG. 7 shows the consolidated data distribution (cluster sizes) from three different Kohonen SOMs of sizes 4×3, 3×3 and 5×2. The consolidation process produces a data distribution that is invariant to the Kohonen SOM size.

In Step 5—one can get feature rankings by a variety of means. The table in FIG. 8 shows the four highest-ranking features (out of 42 features) for three different heart failure patients. Here the features correspond to the time-series. Note that the top ranking features (time-series) are different for the three patients and essentially characterize each patient individually along with the associated data distribution.

In Step 6—individual patient monitoring using the clustering model and the ranked features, the application of personalized clustering models to three different decompensated heart failure patients from the NIH supported study at Mayo Clinic is shown. Patients are labeled as A, B and C. Each case is discussed separately below.

Patient A—readmitted to the hospital 18 days after hospital discharge. Patient A was a 76 years old male who had hypertension and diabetes. Remote monitoring of the patient, after the first heart failure treatment, started 10 days after discharge from the hospital. A personalized model was created on the first day of data collection and used to monitor the patient on subsequent days. The table in FIG. 9 shows the changes in the distribution of time-series data on subsequent days where Day 0 corresponds to the day of model creation. Assignment of data on subsequent days to the three Day 0 clusters was on a nearest cluster basis. As one can observe, the data distribution changed drastically from Day 1. The hospital readmitted the patient for heart failure on Day 11. A fair estimate would be that the "onset" of decompensation started around Day 1 and confirmed by similar observations on subsequent days.

The table in FIG. 10 shows the average values (for Respiration Rate) or counts (for SVC, SinTACHY and NSR) of the four highest ranked features for patient A for each day. These physiological features provide additional information—with their upward, downward or fluctuating trends—to support a judgment about the "onset" of decompensation and about potential treatment. From the accelerometer data, BodyGuardian calculates whether the patient is standing, leaning or lying. Data for Patient A shows that he was standing or leaning almost 100 percent of the time from Day 1. Cardiologists generally know that decompensated heart failure patients cannot lie supine because of breathing problems. Thus, body position is another indicator of heart failure. In this case, multiple indicators confirm the "onset" of decompensated heart failure on Day 1.

Patient B—readmitted to the hospital 17 days after hospital discharge. Patient B was a 73 years old female who had hypertension, diabetes and other ailments. Remote monitoring of the patient, after the first heart failure treatment, started the day after discharge from the hospital. A personalized model was created on the first day of data collection and used it to monitor the patient on subsequent days. The table in FIG. 11 shows the changes in the distribution of time-series data on subsequent days where Day 0 corresponds to the day of model creation. Assignment of data on subsequent days to the three Day 0 clusters was on a nearest cluster basis. Days 5 and 6 were dropped because there was minimal monitoring on those days. As one can observe, the data distribution fluctuates until Day 10 and then remains steady from Day 11 to 14. There was minimal data collection on Day 16. The hospital readmitted the patient for weakness, tiredness, abdominal pain and other problems on Day 17.

From the data distribution in the table in FIG. 11, one can infer that the "onset" of these heart failure related problems started on Day 11 when the data distribution changed.

The table in FIG. 12 shows the counts of the four highest ranked features for patient B for the corresponding days in the table in FIG. 11. These physiological features provide additional information—with their upward, downward or fluctuating trends—to support a judgment about the "onset" of decompensation-related problems and about potential treatment. For this patient, accelerometer data shows that she was standing or leaning on the average 85% of the time every day from Day 10 to 15 compared to 69% average on prior days. In this case, multiple indicators confirm the "onset" of heart failure related problems on about Day 10 or 11.

Patient C—a 75 years old male with hypertension and admitted to the hospital for COPD or asthma. Remote patient monitoring started about three weeks after hospital discharge, but the patient used the devices only part of the day on many of the days. A personalized model was created on the first day of reasonably good data collection and used to monitor the patient on subsequent days.

The table in FIG. 13 shows the changes in the distribution of time-series data on subsequent days where Day 0 corresponds to the day of model creation. Assignment of data on subsequent days to the three Day 0 clusters was on a nearest cluster basis. Several days were dropped because there was minimal monitoring on those days. As one can observe, the data distribution remains fairly steady on the days that had good monitoring. There was no re-admittance of the patient to the hospital during the monitoring period.

The table in FIG. 14 shows the counts of the four highest ranked features for patient C for the corresponding days in the table in FIG. 13. For this patient, accelerometer data shows that he was standing or leaning on the average 66% of the time during a day for the days in the table in FIG. 13, which means he was sleeping well. In this case, there were no significant indicators predicting the "onset" of a major medical event. In fact, the patient did not return to the hospital during the monitoring period of about a month.

Illustrative Computing Environment in Accordance with Certain Embodiments

Figure 15:
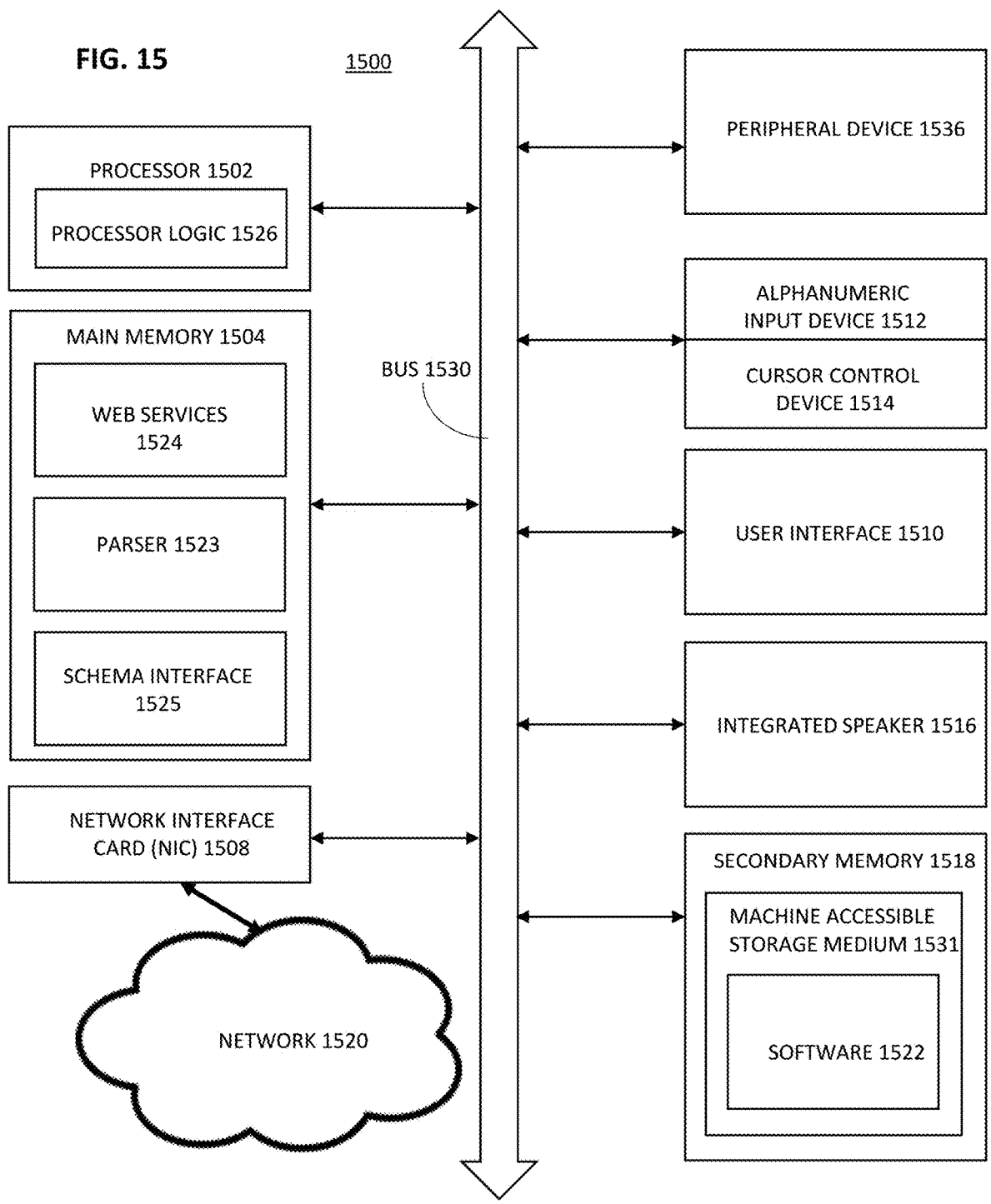
FIG. 15 illustrates a diagrammatic representation of a machine in the exemplary form of a computer system, in accordance with one embodiment of the invention.

FIG. 15 illustrates a diagrammatic representation of a machine 1500 in the exemplary form of a computer system, in accordance with one embodiment, within which a set of instructions, for causing the machine 1500 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1500 includes a processor 1502, a main memory 1504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1518, which communicate with each other via a bus 1530. Main memory 1504 includes information and instructions and software program components necessary for performing and executing the functions with respect to the various embodiments of the systems, methods for implementing embodiments of the invention described herein. Instructions may be stored within main memory 1504. Main memory 1504 and its sub-elements are operable in conjunction with processing logic 1526 and/or software 1522 and processor 1502 to perform the methodologies discussed herein.

Processor 1502 represents one or more devices such as a microprocessor, central processing unit, or the like. More particularly, the processor 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1502 may also be one or more devices such as an application specific integrated circuit (ASIC), a field programmable gate array (FPGA), a digital signal processor (DSP), network processor, or the like. Processor 1502 is configured to execute the processing logic 1526 for performing the operations and functionality which are discussed herein.

The computer system 1500 may further include one or more network interface cards 1508 to interface with the computer system 1500 with one or more networks 1520. The computer system 1500 also may include a user interface 1510 (such as a video display unit, a liquid crystal display (LCD), or a cathode ray tube (CRT)), an alphanumeric input device 1512 (e.g., a keyboard), a cursor control device 1514 (e.g., a mouse), and a signal generation device 1516 (e.g., an integrated speaker). The computer system 1500 may further include peripheral device 1536 (e.g., wireless or wired communication devices, memory devices, storage devices, audio processing devices, video processing devices, etc.).

The secondary memory 1518 may include a non-transitory machine-readable storage medium (or more specifically a non-transitory machine-accessible storage medium) 1531 on which is stored one or more sets of instructions (e.g., software 1522) embodying any one or more of the methodologies or functions described herein. Software 1522 may also reside, or alternatively reside within main memory 1504, and may further reside completely or at least partially within the processor 1502 during execution thereof by the computer system 1500, the main memory 1504 and the processor 1502 also constituting machine-readable storage media. The software 1522 may further be transmitted or received over a network 1520 via the network interface card 1508.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A computer-implemented method performed by a monitoring system having at least a processor and a memory therein to execute instructions for detecting events about, or changes in, a decompensated heart failure (DHF) patient, the computer-implemented method comprising:
   measuring, via a plurality of different types of sensors coupled in communication with the monitoring system and proximate the DHF patient, a corresponding plurality of different characteristics of the DHF patient, over a first period of time;
   collecting at the monitoring system a continual stream of data from the plurality of different types of sensors comprising the measured corresponding plurality of different characteristics of the DHF patient over the first period of time;
   creating in real-time at the monitoring system a unified statistical model of normal functioning of the DHF patient solely based on the collected continual stream of data from the plurality of different types of sensors comprising the measured corresponding plurality of different characteristics of the DHF patient over the first period of time;
   monitoring via the monitoring system the DHF patient over a second, subsequent, period of time for events or changes outside the unified statistical model of normal functioning of the DHF patient by:
      measuring via the plurality of different types of sensors a corresponding plurality of different characteristics of the DHF patient over the second period of time;
      collecting at the monitoring system a continual stream of data from the plurality of different types of sensors comprising the measured corresponding plurality of different characteristics of the DHF patient over the second period of time; and
      evaluating the DHF patient at the monitoring system solely based on:
         the collected continual stream of data comprising the measured corresponding plurality of different characteristics of the DHF patient over the second period of time; and
         the unified statistical model of normal functioning of the DHF patient;
   detecting at the monitoring system events or changes outside the unified statistical model of normal functioning of the DHF patient responsive to monitoring the DHF patient over the second period of time for events or changes outside the unified statistical model of normal functioning of the DHF patient;
   notifying via the monitoring system a supervisory system responsive to detecting at the monitoring system events or changes outside the unified statistical model of normal functioning of the DHF patient; and
   medically responding to the DHF patient in response to the supervisory system receiving the notification.

2. The method of claim 1, wherein collecting at the monitoring system the continual stream of data from the plurality of different types of sensors comprising the measured corresponding plurality of different characteristics of the DHF patient over the first period of time comprises collecting at the monitoring system a continual stream a respective plurality of time-series data comprising the measured corresponding plurality of different characteristics of the DHF patient over the first period of time.

3. The method of claim 2, wherein creating in real-time at the monitoring system the unified statistical model of normal functioning of the DHF patient solely based on the collected continual stream of data from the plurality of different types of sensors comprising the measured corresponding plurality of different characteristics of the DHF patient over the first period of time comprises creating in real-time at the monitoring system the unified statistical model of normal functioning of the DHF patient solely based on the collected continual stream of the plurality of time-series data;

wherein collecting at the monitoring system a continual stream of data from the plurality of different types of sensors comprising the measured corresponding plurality of different characteristics of the DHF patient over the second period of time comprises collecting at the monitoring system a continual stream of a respective plurality time-series data from the plurality of different types of sensors comprising the measured corresponding plurality of different characteristics of the DHF patient over the second period of time; and wherein evaluating the DHF patient at the monitoring system solely based on the collected continual stream of data comprising the measured corresponding plurality of different characteristics of the DHF patient over the second period of time, comprises evaluating the DHF patient at the monitoring system solely based on the collected continual stream of the plurality of time-series data comprising the measured corresponding plurality of different characteristics of the DHF patient over the second period of time.

4. The method of claim 3, wherein collecting at the monitoring system the respective plurality of time-series data comprising the measured corresponding plurality of different characteristics of the DHF patient over the first period of time comprises receiving a total number, N, of time-series data comprising the measured corresponding plurality of different characteristics of the DHF patient over the first period of time.

5. The method of claim 4, wherein creating in real-time at the monitoring system the unified statistical model of normal functioning of the DHF patient solely based on the collected continual stream of the plurality of time-series data comprises:
determining a duration, P;
recording average values of the plurality of time-series data, for the duration P, for a total, T, of such durations P, from the collected continual stream of data; and
creating a clustering model to record a distribution of the plurality of time-series data over for the period T times P using the T number of N time-series.

6. The method of claim 5, wherein the clustering model comprises a Kohonen self-organizing map.

7. The method of claim 5, wherein evaluating the DHF patient at the monitoring system solely based on the collected continual stream of the plurality of time-series data comprising the measured corresponding plurality of different characteristics of the DHF patient over the second period of time comprises applying the clustering model to monitor the DHF patient in subsequent time periods of length T times P using the N time-series data.

8. The method of claim 7, wherein notifying via the monitoring system the supervisory system responsive to detecting at the monitoring system events or changes outside the unified statistical model of normal functioning of the DHF patient comprises notifying via the monitoring system the supervisory system responsive to detecting at the monitoring system deviations in the distribution of the time-series data.

9. A non-transitory computer readable storage media having instructions stored thereon that, when executed by a processor of a system, cause the system to perform operations comprising:
measuring via a plurality of different types of sensors coupled in communication with system and proximate a decompensated heart failure (DHF) patient, a corresponding plurality of different characteristics of the DHF patient over a first period of time;
collecting at the system a continual stream of data from the plurality of different types of sensors comprising the measured corresponding plurality of different characteristics of the DHF patient over the first period of time;
creating in real-time at the system a unified statistical model of normal functioning of the DHF patient solely based on the collected continual stream of data from the plurality of different types of sensors comprising the measured corresponding plurality of different characteristics of the DHF patient over the first period of time;
monitoring via the system the DHF patient over a second, subsequent, period of time, for events or changes outside the unified statistical model of normal functioning of the DHF patient by:
measuring via the plurality of different types of sensors a corresponding plurality of different characteristics of the DHF patient over the second period of time;
collecting at the monitoring system a continual stream of data from the plurality of different types of sensors comprising the measured corresponding plurality of different characteristics of the DHF patient over the second period of time; and
evaluating the DHF patient at the monitoring system solely based on:
the collected continual stream of data comprising the measured corresponding plurality of different characteristics of the DHF patient over the second period of time; and
the unified statistical model of normal functioning of the DHF patient;
detecting at the system events or changes outside the unified statistical model of normal functioning of the DHF patient responsive to monitoring the DHF patient over the second period of time for events or changes outside the statistical model of normal functioning of the DHF patient; and
notifying via the system a supervisory system responsive to detecting at the system events or significant outside the unified statistical model of normal functioning of the DHF patient; and
medically responding to the DHF patient in response to the supervisory system receiving the notification.

10. The non-transitory computer readable storage media of claim 9, wherein collecting at the system the continual stream of data from the plurality of different types of sensors comprising the measured corresponding plurality of different characteristics of the DHF patient over the first period of time comprises collecting at the system a continual stream of a respective plurality of time-series data comprising the measured corresponding plurality of different characteristics of the DHF patient over the first period of time.

11. The non-transitory computer readable storage media of claim 10, wherein creating in real-time at the system the unified statistical model of normal functioning of the DHF patient solely based on the collected continual stream of data from the plurality of different types of sensors comprising the measured corresponding plurality of different characteristics of the DHF patient over the first period of time comprises creating in real-time at the system the unified statistical model of normal functioning of the DHF patient solely based on the collected continual stream of the plurality of time-series data;

wherein collecting at the system a continual stream of data from the plurality of different types of sensors comprising the measured corresponding plurality of different characteristics of the DHF patient over the second period of time comprises collecting at the system a continual stream of a respective plurality time-series data from the plurality of different types of sensors comprising the measured corresponding plurality of different characteristics of the DHF patient over the second period of time; and wherein evaluating the DHF patient at the system solely based on the collected continual stream of data comprising the measured corresponding plurality of different characteristics of the DHF patient over the second period of time, comprises evaluating the DHF patient at the system solely based on the collected continual stream of the plurality of time-series data comprising the measured corresponding plurality of different characteristics of the DHF patient over the second period of time.

12. The non-transitory computer readable storage media of claim 11, wherein collecting at the system the respective plurality of time-series data comprising the measured corresponding plurality of different characteristics of the DHF patient over the first period of time comprises receiving a total number, N, of time-series data comprising the measured corresponding plurality of different characteristics of the DHF patient over the first period of time.

13. The non-transitory computer readable storage media of claim 12, wherein creating in real-time at the system the unified statistical model of normal physical functioning of the DHF patient solely based on the collected continual stream of the plurality of time-series data comprises:

determining a duration, P;

recording average values of the plurality of time-series data, for the duration P, for a total, T, of such durations P, from the collected continual stream of data; and creating a clustering model to record a distribution of the time-series data over for the period T times P using the T number of N time-series.

14. The non-transitory computer readable storage media of claim 13, wherein creating a clustering model to record a distribution of the time-series data over for the period T times P using the T number of N time-series comprises creating a Kohonen self-organizing map to record a distribution of the time-series data over for the period T times P using the T number of N time-series.

15. The non-transitory computer readable storage media of claim 13, wherein evaluating the DHF patient at the monitoring system solely based on the collected continual stream of the plurality of time-series data comprising the measured corresponding plurality of different characteristics of the DHF patient over the second period of time comprises applying the clustering model to monitor the DHF patient in subsequent time periods of length T times P using the N time-series data.

16. The non-transitory computer readable storage media of claim 15, wherein notifying via the system the supervisory system responsive to detecting at the system events or changes outside the unified statistical model of normal functioning of the DHF patient comprises notifying via the system the supervisory system responsive to detecting at the system deviations in the distribution of the time-series data.

* * * * *

UNITED STATES PATENT AND TRADEMARK OFFICE
CERTIFICATE OF CORRECTION

PATENT NO. : 12,298,757 B2
APPLICATION NO. : 17/286303
DATED : May 13, 2025
INVENTOR(S) : Asim Roy et al.

Page 1 of 1

It is certified that error appears in the above-identified patent and that said Letters Patent is hereby corrected as shown below:

On the Title Page

Item (73), there should be two assignees listed:
Arizona Board of Regents on behalf of Arizona State University, Scottsdale, AZ (US)
Mayo Foundation for Medical Education and Research, Rochester, MN (US).

Signed and Sealed this
Fifteenth Day of July, 2025

Coke Morgan Stewart
*Acting Director of the United States Patent and Trademark Office*